(12) United States Patent
Shokai

(10) Patent No.: US 12,406,160 B2
(45) Date of Patent: Sep. 2, 2025

(54) IMAGE FORMING APPARATUS

(71) Applicant: Toshiba Tec Kabushiki Kaisha, Tokyo (JP)

(72) Inventor: Takeharu Shokai, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 9 days.

(21) Appl. No.: 18/594,904

(22) Filed: Mar. 4, 2024

(65) Prior Publication Data

US 2024/0428033 A1    Dec. 26, 2024

(30) Foreign Application Priority Data

Jun. 22, 2023   (JP) .................. 2023-102646

(51) Int. Cl.
*G06K 17/00*   (2006.01)
*H04N 1/00*   (2006.01)

(52) U.S. Cl.
CPC ..... *G06K 17/0025* (2013.01); *H04N 1/00602* (2013.01)

(58) Field of Classification Search
CPC ................. G06K 17/0025; H04N 1/00602
USPC ............................................. 235/375
See application file for complete search history.

(56) References Cited

U.S. PATENT DOCUMENTS

| | | | |
|---|---|---|---|
| 6,404,335 | B1 | 6/2002 | Ohno |
| 7,428,067 | B2* | 9/2008 | Kiwada .............. G06K 19/0723 |
| | | | 235/382 |
| 2007/0126578 | A1* | 6/2007 | Broussard ............ G06Q 10/087 |
| | | | 705/28 |
| 2009/0009790 | A1* | 1/2009 | Hosokawa ......... G06K 17/0025 |
| | | | 358/1.14 |
| 2010/0007710 | A1* | 1/2010 | Miyaso .................. H04N 1/387 |
| | | | 358/1.15 |
| 2023/0022340 | A1* | 1/2023 | Maeda .................... G06K 1/121 |
| 2024/0251045 | A1* | 7/2024 | Murahashi ......... H04N 1/00689 |

FOREIGN PATENT DOCUMENTS

| | | |
|---|---|---|
| JP | 2003288557 A | 10/2003 |
| JP | 2011051344 A | 3/2011 |

* cited by examiner

*Primary Examiner* — Michael G Lee
*Assistant Examiner* — David Tardif
(74) *Attorney, Agent, or Firm* — Kim & Stewart LLP

(57) ABSTRACT

According to one embodiment, an image forming apparatus has a printing unit to print images on a sheet of paper from a paper storage unit and a conveying unit configured to convey sheets from the storage unit to the printing unit. A tag reader/writer communicates with a wireless tag on a sheet when the sheet is at a communication position on the conveyance path. A control unit determines whether a writing of data to a tag on a first sheet has succeeded, then controls the printing unit to print on the first sheet if the writing of data succeeded but not if the writing of data to the wireless tag failed. When writing of data to the wireless tag has failed, the control unit executes a tag data writing retry process on another sheet from the paper storage unit.

20 Claims, 6 Drawing Sheets

IMAGE FORMING APPARATUS

CROSS-REFERENCE TO RELATED APPLICATION

This application is based upon and claims the benefit of priority from Japanese Patent Application No. 2023-102646, filed Jun. 22, 2023, the entire contents of which are incorporated herein by reference.

FIELD

Embodiments described herein relate generally to an image forming apparatus.

BACKGROUND

An image forming apparatus having an RFID reader/writer function is capable of not only forming an image on paper in which an RFID tag is embedded but also writing data to the RFID tag.

In the related art, when a tag data writing error occurs with an RFID-tagged paper, ink may be saved by not printing an image on the paper. However, the tagged paper for which the data writing error occurs is usually not reused.

DETAILED DESCRIPTION

Figure 1:
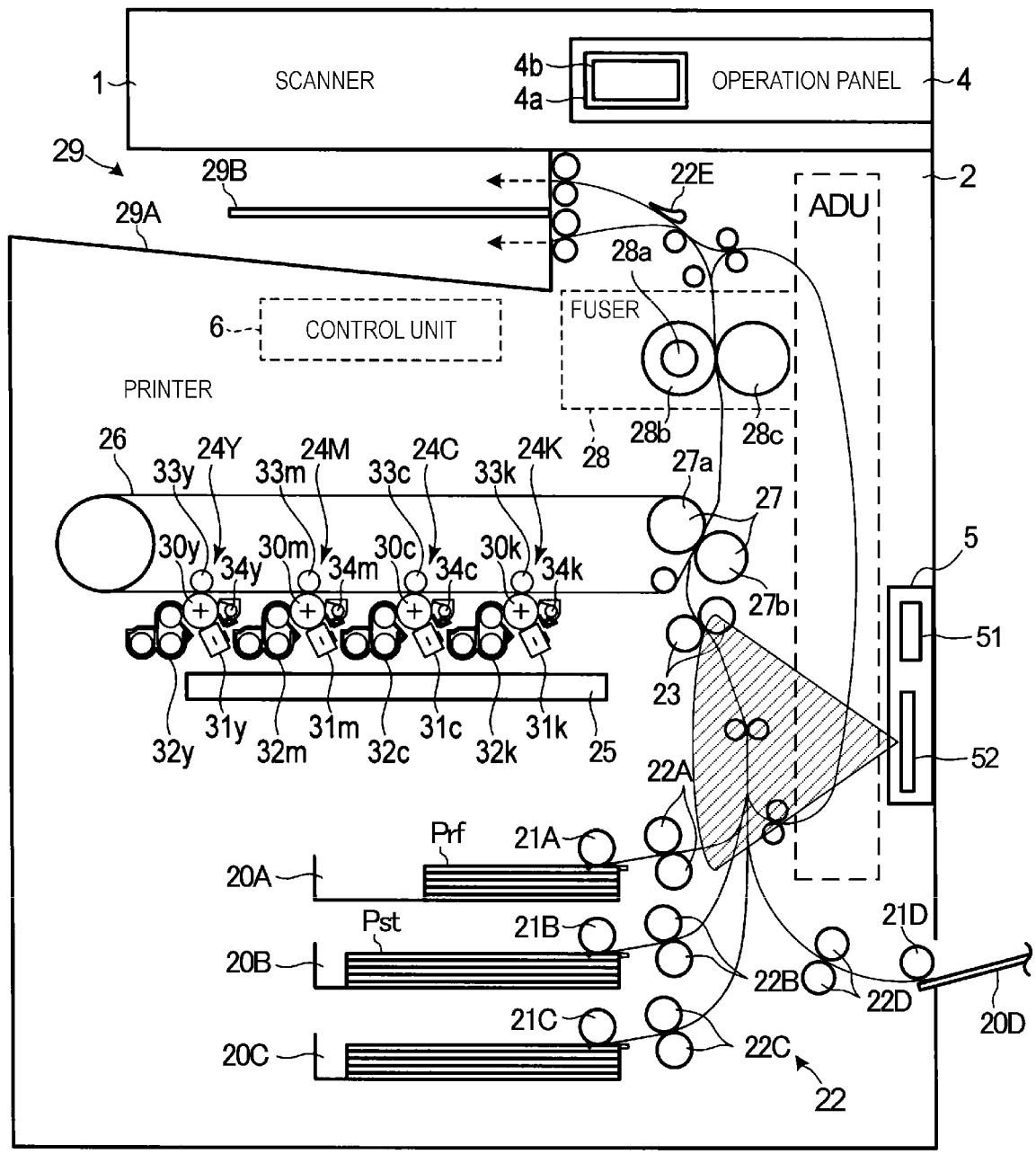
FIG. 1 is a schematic cross-sectional of an image forming apparatus according to a first embodiment.

An image forming apparatus of one embodiment notifies a user of the paper on which an RFID data writing error occurs to permit the paper to be reused.

According to one embodiment, an image forming apparatus includes a paper r storage unit, a printing unit configured to print images on a sheet of paper from the paper storage unit, a conveying unit configured to convey sheets one by one along a path from the paper storage unit to the printing unit, a tag reader/writer unit configured to communicate with a wireless tag on a sheet being conveyed by the conveying unit when the sheet is at a communication position on the path before the printing unit, and a control unit. The control unit is configured to determine whether a writing of first data to a wireless tag on a first sheet has succeeded by controlling the tag reader/writer to read data from the wireless tag on the first sheet, control the printing unit to print an image on the first sheet when it is determined the writing of the first data to the wireless tag on the first sheet succeeded, control the printing unit not to print any image on the first sheet when it is determined the writing of the first data to the wireless tag on the first sheet failed, and, after it is determined the writing of the first data to the wireless tag on the first sheet failed, execute a retry process by controlling the conveying unit to convey a second sheet from paper storage unit to the communication position on the path and the tag reader/writer to write the first data to a wireless tag on the second sheet.

Hereinafter, an image forming apparatus according to certain example embodiments will be described with reference to the drawings. It is noted that in the drawings, the depicted dimensions, relative scale, and the like of each component may be varied as appropriate for purposes of explanation. Further, in each drawing, aspects and components may be omitted as appropriate for purposes explanatory convenience.

First Embodiment

FIG. 1 is a schematic cross-sectional view illustrating an example of an image forming apparatus 100 according to a first embodiment. The image forming apparatus 100 is a digital multifunctional peripheral (MFP) and includes a scanner 1, a printer 2, an operation panel 4, an RFID reader/writer 5, and a control unit 6.

The scanner 1 is a device that reads (scans) an image from a document and converts the scanned image into image data. The scanner 1 includes, for example, a charge coupled device (CCD) line sensor that converts the image on the document into the image data. The scanner 1 may have the function of scanning the document placed on a document table (platen) glass. Further, the scanner 1 may have a function of reading the image of the document as it is conveyed by an auto document feeder (ADF). The scanner 1 is installed, for example, on the top of a main body of the MFP. The scanner 1 is controlled by the control unit 6. The scanner 1 outputs the image data of the document to control unit 6.

The printer 2 is an electrophotographic printer in this example. The printer 2 forms (prints) the image on paper or other recording medium. The printer 2 has a color printing function that prints a color image on the paper and a monochrome printing function that prints a monochrome (for example, black) image on the paper. The printer 2 forms the color image by using toner of a plurality of colors (for example, three colors of yellow (Y), cyan (C), and magenta (M)). Further, the printer 2 forms a monochrome image by using monochrome (for example, black (K)) toner.

In the configuration example illustrated in FIG. 1, the printer 2 includes paper feed cassettes 20A, 20B, and 20C. The paper feed cassettes 20A, 20B, and 20C that supply paper. Each of these paper feed cassettes 20A, 20B, and 20C stores paper of a particular type (for example, size, paper quality). Furthermore, the printer 2 also has a manual feed tray 20D. The manual feed tray 20D may receive/supply any type of paper (for example, any size or paper quality). The paper feed cassettes 20A, 20B, 20C and the manual feed tray 20D may be referred to individual or collective as a paper feed unit. The paper supplied by each paper feed cassette 20A, 20B, 20C and the manual feed tray can be regular paper $P_{st}$ of any size or RFID-tagged paper $P_{rf}$ (also referred to as RFID paper $P_{rf}$). An RFID tag is embedded in the RFID paper $P_{rf}$. In the example illustrated in FIG. 1, the RFID paper $P_{rf}$ is set in the paper feed cassette 20A.

The paper feed cassettes 20A, 20B, and 20C have pick-up rollers 21A, 21B, and 21C, respectively. The pick-up rollers 21A, 21B, and 21C pick up the paper one by one from the respective paper feed cassettes 20A, 20B, and 20C. Similarly, the manual feed tray 20D is also provided with a pick-up roller 21D that feeds the paper one by one from the manual feed tray 20D. These pick-up rollers 21A, 21B, 21C, and 21D supply the paper to the conveyance path (conveying unit 22) configured with a plurality of conveyance rollers 22A, 22B, 22C, 22D, and the like.

The conveying unit 22 conveys the paper within the printer 2. For example, the conveying unit 22 conveys the paper picked up by one of the pick-up rollers 21A, 21B, 21C, and 21D to a registration roller 23. The registration roller 23 corrects an inclination (angle) of the paper so the paper is substantially perpendicular to the conveyance direction by stopping the conveyed paper against the registration roller 23. The registration roller 23 then conveys the paper to the transfer position at the appropriate timing for transferring the image from a transfer belt 26 to the paper. The conveying unit 22 conveys the paper through the registration roller 23 to the transfer position. The conveying unit 22 conveys the paper from the transfer position to a fixer 28. The conveying unit 22 conveys the paper after the fixer 28 to either a paper discharge unit 29 or an automatic double-sided unit (ADU). The conveying unit 22 includes a flapper 22E in front of the paper discharge unit 29. The flapper 22E at a position between the first paper discharge unit and the second paper discharge unit of the paper discharge unit 29 switches a discharge destination.

Figure 2:
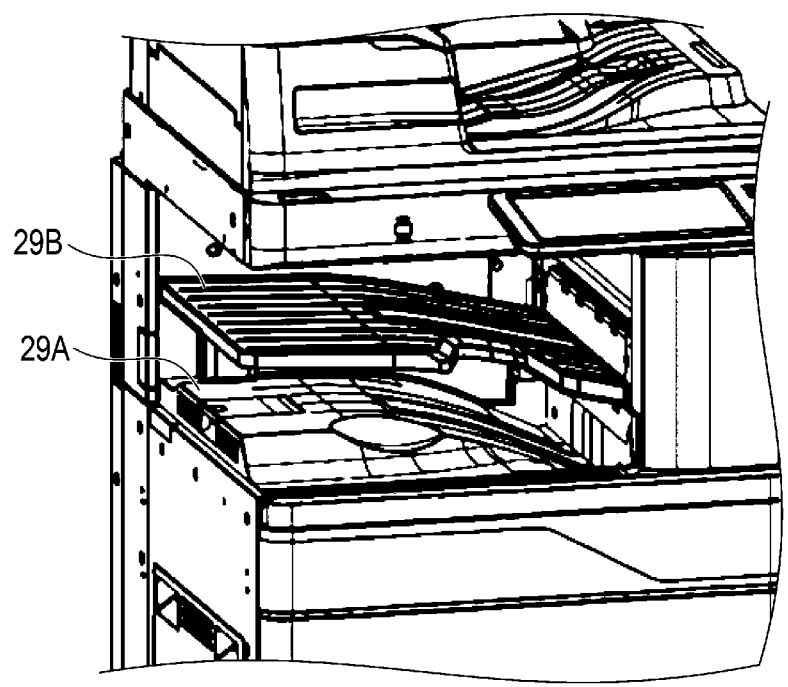
FIG. 2 is a perspective view of a paper discharge unit of an image forming apparatus.

FIG. 2 is a perspective view illustrating an example of the paper discharge unit 29 As illustrated in FIG. 2, the paper discharge unit 29 is provided with a lower stage paper discharge tray 29A that functions as a first paper discharge unit and an upper stage paper discharge tray 29B that functions as a second paper discharge unit.

The printer 2 has a plurality of image forming units 24Y, 24M, 24C, and 24K. These plurality of image forming units 24Y, 24M, 24C, and 24K form images to be transferred to the paper. In the configuration example illustrated in FIG. 1, the image forming unit 24Y forms the image with yellow toner. The image forming unit 24M forms the image with magenta toner. The image forming unit 24C forms the image with cyan toner. The image forming unit 24K forms the image with black toner.

The image forming units 24Y, 24M, 24C, and 24K include photosensitive drums 30$y$, 30$m$, 30$c$, and 30$k$, chargers 31$y$, 31$m$, 31$c$, and 31$k$, developing devices 32$y$, 32$m$, 32$c$, and 32$k$, and transfer rollers 33$y$, 33$m$, and 33$c$, 33$k$, and cleaners 34$y$, 34$m$, 34$c$, and 34$k$. Since, in general, the only difference is color, unless there is the particular need to distinguish between image forming units 24Y, 24M, 24C, and 24K, each may be referred to as an image forming unit 24 and similarly for each photosensitive drum 30, charger 31, developing device 32, transfer roller 33, and cleaner 34.

The photosensitive drum 30 is an image carrier on which the electrostatic image latent is formed. The photosensitive drum 30 is rotated by a rotating shaft. The charger 31 charges the surface of the photosensitive drum 30 to a predetermined potential. The charger 31 has a grid for adjusting the charging output to the photosensitive drum 30. The developing device 32 develops the electrostatic latent image formed on the photosensitive drum 30 with the toner. The transfer roller 33 transfers a toner image developed on the photosensitive drum 30 onto the transfer belt 26. The cleaner 34 cleans the surface of the photosensitive drum 30 after the transfer.

An exposure unit 25 forms the electrostatic latent images on the photosensitive drums 30 of each of the image forming units 24Y, 24M, 24C, and 24K by using a laser beam. The exposure unit 25 irradiates the photosensitive drum 30 with the laser beam that is controlled according to the image data using the optical system such as a polygon mirror. The laser beam from the exposure unit 25 forms the electrostatic latent image on the surface of each photosensitive drum 30. The exposure unit 25 controls the laser beam according to a control signal from the control unit 6.

The image forming unit 24 develops the electrostatic latent image formed on the photosensitive drum 30 by the developing device 32. The developing device 32 includes a developer container having a developing roller. The developer container stores toner of the particular color of the image forming unit 24. The toner is stirred together with a carrier in the developer container. A developing bias is applied to the developing roller. The biased developing supplies the toner to the electrostatic latent image on the photosensitive drum 30. The electrostatic latent image on the photosensitive drum 30 becomes the toner image transferred to the paper or the like.

The transfer belt 26 is an intermediate transfer body. The image forming unit 24 transfers (primary transfer) the toner image from the photosensitive drum 30 onto the transfer belt 26 by applying the primary transfer voltage to the transfer belt 26 by using the transfer roller 33. For example, in the image forming unit 24K, the transfer roller 33$k$ transfers the black toner image formed by the developing device 32$k$ to the transfer belt 26. Further, when forming the color image, each of the image forming units 24Y, 24M, 24C, and 24K transfers the toner images of each color to the transfer belt 26 in an overlapping manner.

The transfer unit 27 transfers the toner image from the transfer belt 26 to the paper at the secondary transfer position. In other words, the transfer unit 27 forms the toner image on the paper. The transfer unit 27 can be referred as a printing unit. The secondary transfer position, which may be referred to as a printing position, is where the toner image is transferred to the paper from the transfer belt 26. The secondary transfer position is where a support roller 27$a$ and a secondary transfer roller 27$b$ face each other.

The fixer 28 fixes the toner (toner image) to the paper. The fixer 28 applies heat to the paper. In the example illustrated in FIG. 2, the fixer 28 has a heat roller 28$b$ (having a built-in heating unit 28$a$) and a pressure roller 28$c$ (pressing roller) that is in contact with a fixing belt that is heated by the heat roller 28$b$. The heating unit 28$a$ may be any heater by which temperature can be controlled. For example, the heating unit 28$a$ may be a heater lamp such as a halogen lamp or may be an induction heating (IH) type heater. Further, the heating unit 28$a$ may comprise a plurality of heaters. The fixer 28 conveys the paper after the fixing processing to one of the paper discharge unit 29 or the ADU.

The operation panel 4 is a user interface (operator panel). The operation panel 4 includes various buttons and a display unit 4$a$ including a touch panel 4$b$. The control unit 6 controls contents displayed on the display unit 4$a$ of the operation panel 4. The display unit 4$a$ functions as a notification unit. Further, the operation panel 4 provides information to the control unit 6 as input to the touch panel 4$b$ or the buttons of the operation panel 4. The user designates the operation mode of the image forming apparatus 1 and inputs other information such as setting information (e.g., print parameters or the like) on the operation panel 4.

The RFID reader/writer 5 includes a controller (also referred as an RFID module 51) and an antenna 52. The RFID module 51 writes the data from the control unit 6 via the antenna 52 to the RFID tag embedded in a piece of the RFID paper $P_{rf}$ while the paper is stopped by the registration roller 23. Further, the RFID module 51 reads data already written in the RFID tag via the antenna 52 and outputs the read data to the control unit 6. The positioning and transmitting/receiving power of the RFID reader/writer 5 are set so that the transmitting/receiving range of the antenna 52 covers the RFID tag of the RFID paper $P_{rf}$ when stopped at the registration roller 23.

Figure 3:
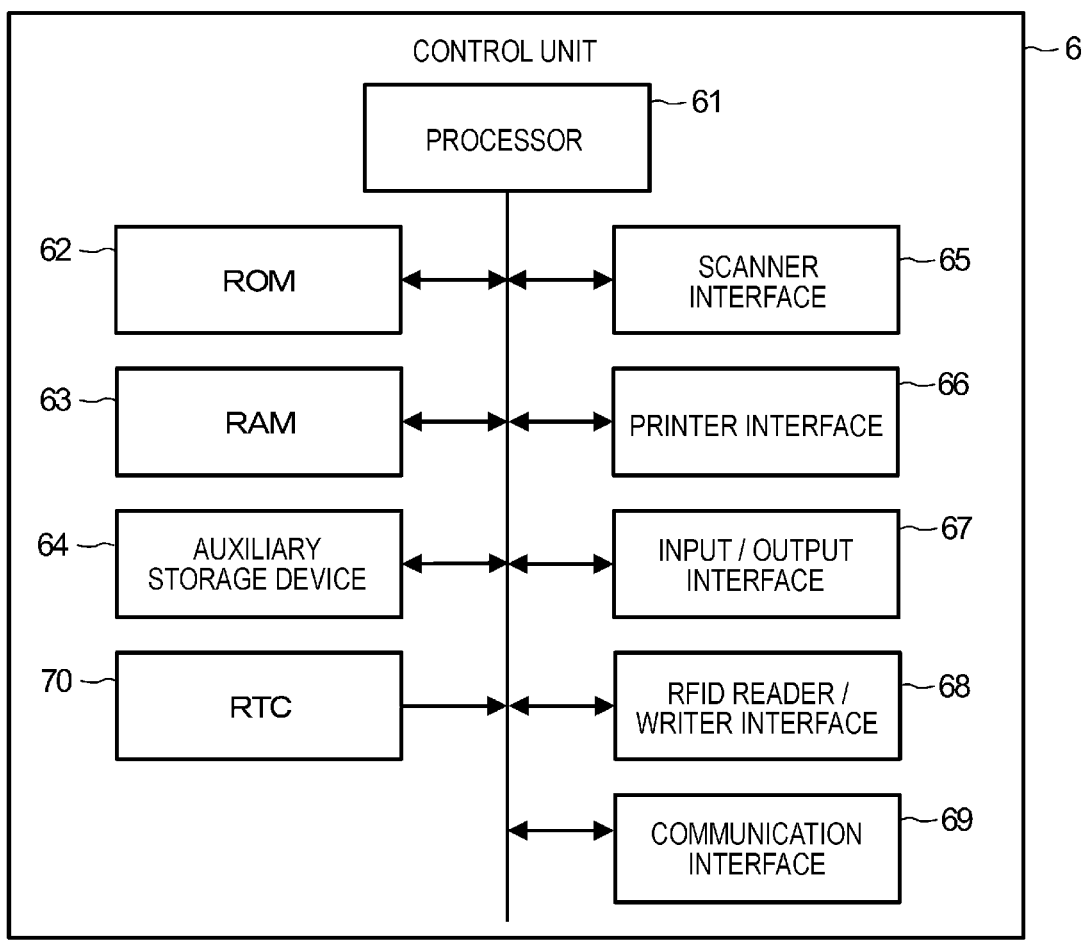
FIG. 3 is a block diagram of a control unit of an image forming apparatus.

An example of a configuration of the control unit 6 of the image forming apparatus 100 will be described with reference to FIG. 3. FIG. 3 is a block diagram illustrating the control unit 6. The control unit 6 includes, for example, a processor 61, a read-only memory (ROM) 62, a random-access memory (RAM) 63, an auxiliary storage device 64, a scanner interface 65, a printer interface 66, an input/output interface 67, RFID reader/writer interface 68, a communication interface 69, and a real-time clock (RTC) 70.

The processor 61 performs processing such as computation and control necessary for the operation of the image forming apparatus 100. The processor 61 controls components to realize the various functions of the image forming apparatus 100 based on programs such as system software, application software, or firmware stored in the ROM 62 or the auxiliary storage device 64. The processor 61 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. In some examples, the processor 61 may be a combination of a plurality of these devices.

The ROM 62 is a non-volatile computer-readable storage medium. The ROM 62 stores data or various setting values used by the processor 61 to perform various processes.

The RAM 63 is volatile memory. The RAM 63 is used as a so-called work area or the like for temporarily storing data when the processor 61 performs various processes.

The auxiliary storage device 64 is a non-volatile computer-readable storage medium. The auxiliary storage device 64 is, for example, an electric erasable programmable read-only memory (EEPROM®), a hard disk drive (HDD), or a solid-state drive (SSD). The auxiliary storage device 64 stores data used by the processor 61 to perform various processes, data generated with processing by the processor 61, various setting values, and the like.

It is noted that the image forming apparatus 100 may be provided with the interface into which the storage medium such as a removable optical disk, a memory card, or a universal serial bus (USB) memory can be used instead of the auxiliary storage device 64 or in addition to the auxiliary storage device 64.

The programs stored in the ROM 62 or the auxiliary storage device 64 may be the programs with instructions for executing the processing described below. As an example, the image forming apparatus 100 is transferred with the program stored in the ROM 62 or the auxiliary storage device 64. In other examples, the image forming apparatus 100 may be transferred without the program being pre-stored in the ROM 62 or the auxiliary storage device 64 and such a program may be separately transferred or the like and then written into the ROM 62 or the auxiliary storage device 64. The program may be transferred, for example, by recording the program on a removable storage medium such as a magnetic disk, a magneto-optical disk, an optical disk, or a semiconductor memory, or by downloading the program via a network.

The scanner interface 65 is an interface for the scanner 1. The scanner interface 65 transmits control signals output from the processor 61 to the scanner 1. The scanner interface 65 receives the image data of a document and operational state signals from the scanner 1, and provides the operational state signal(s) to the processor 61.

The printer interface 66 is an interface for the printer 2. The printer interface 66 transmits control signals output from the processor 61 to the printer 2. Further, the printer interface 66 receives operating state signals from the printer 2 and provides the operating state signal(s) to the processor 61.

The input/output interface 67 is an interface for the operation panel 4. The input/output interface 67 transmits information to be displayed on the display unit 4a to the operation panel 4 from the processor 61. The input/output interface 67 also receives information input via the touch panel 4b or buttons on the operation panel 4 and provides this information to the processor 61.

The RFID reader/writer interface 68 is an interface for the RFID reader/writer 5. The RFID reader/writer interface 68 transmits data to be written to the RFID tag of RFID paper $P_{rf}$ to the RFID reader/writer 5. Furthermore, the RFID reader/writer interface 68 receives data that has been read from the RFID tag by the RFID reader/writer 5 to the processor 61.

The communication interface 69 can be a wired or wireless interface for communicating with a server device and/or a user terminal via a network, or the like. The communication interface 69 is used for receiving data, such as image data to be printed and the data to be written to the RFID tag, and control information such as that related to the selection of printing paper and the number of copies to be printed or the like.

The RTC 70 is a clock or a circuit with a built-in clock function.

Figure 4:
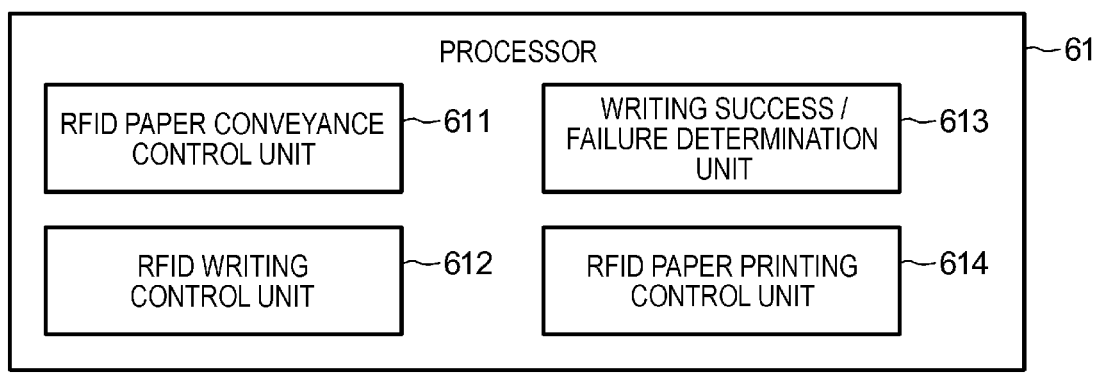
FIG. 4 is a block diagram of a processor.

FIG. 4 is a block diagram illustrating an example of the functional configuration aspects of the processor 61. The processor 61 provides an RFID paper conveyance control unit 611, an RFID writing control unit 612, a writing success/failure determination unit 613, and an RFID paper printing control unit 614. For example, the processor 61 executes a program stored in the ROM 62 or the auxiliary storage device 64 to realize the described functions of the RFID paper conveyance control unit 611, RFID writing unit control 612, writing success/failure determination unit 613, and RFID paper printing control unit 614. It is noted that the RFID paper conveyance control unit 611, the RFID writing control unit 612, the writing success/failure determination unit 613, and the RFID paper printing control unit 614 may also or instead be realized by hardware such as large scale integration (LSI), an application specific integrated circuit (ASIC), and a field-programmable gate array (FPGA) providing the same functions as those described for the processor 61 executing a software program or the like.

The RFID paper conveyance control unit 611 controls the conveying of the RFID paper $P_{rf}$ by controlling the driving of each roller of the conveying unit 22 of the printer 2 via the printer interface 66.

The RFID writing control unit 612 controls the RFID reader/writer 5 via the RFID reader/writer interface 68 to control writing of data to the RFID tag of the RFID paper $P_{rf}$.

The writing success/failure determination unit 613 determines whether the writing has succeeded or failed by comparing the read data input from the RFID reader/writer 5 via the RFID reader/writer interface 68 with the data that was instructed to be written. It is noted that, in some examples, the RFID reader/writer 5 has a write data verification function, and the writing success/failure determination unit 613 may not need to match read/write data, but may rather identify the success or failure of a writing based on a verification result provided from the RFID reader/writer 5 via the RFID reader/writer interface 68.

The RFID paper printing control unit 614 controls printing, that is, image formation on the RFID paper $P_{rf}$ depending on whether the writing of data to the RFID tag succeeded. Specifically, the RFID paper printing control unit 614 performs printing on the RFID paper $P_{rf}$ only after the writing succeeds and controls not to print if the writing fails.

It is noted that, based on the printing control by the RFID paper printing control unit 614, the RFID paper conveyance control unit 611 controls the discharge destination of the RFID paper $P_{rf}$ to switch between the lower stage paper discharge tray 29A and the upper stage paper discharge tray 29B.

Hereinafter, the operation of the image forming apparatus 100 according to the first embodiment will be described with reference to FIG. 5. It is noted that the specifics of the processing in the following description are merely examples, and various processing modifications that can obtain similar effects can be used as appropriate.

Figure 5:
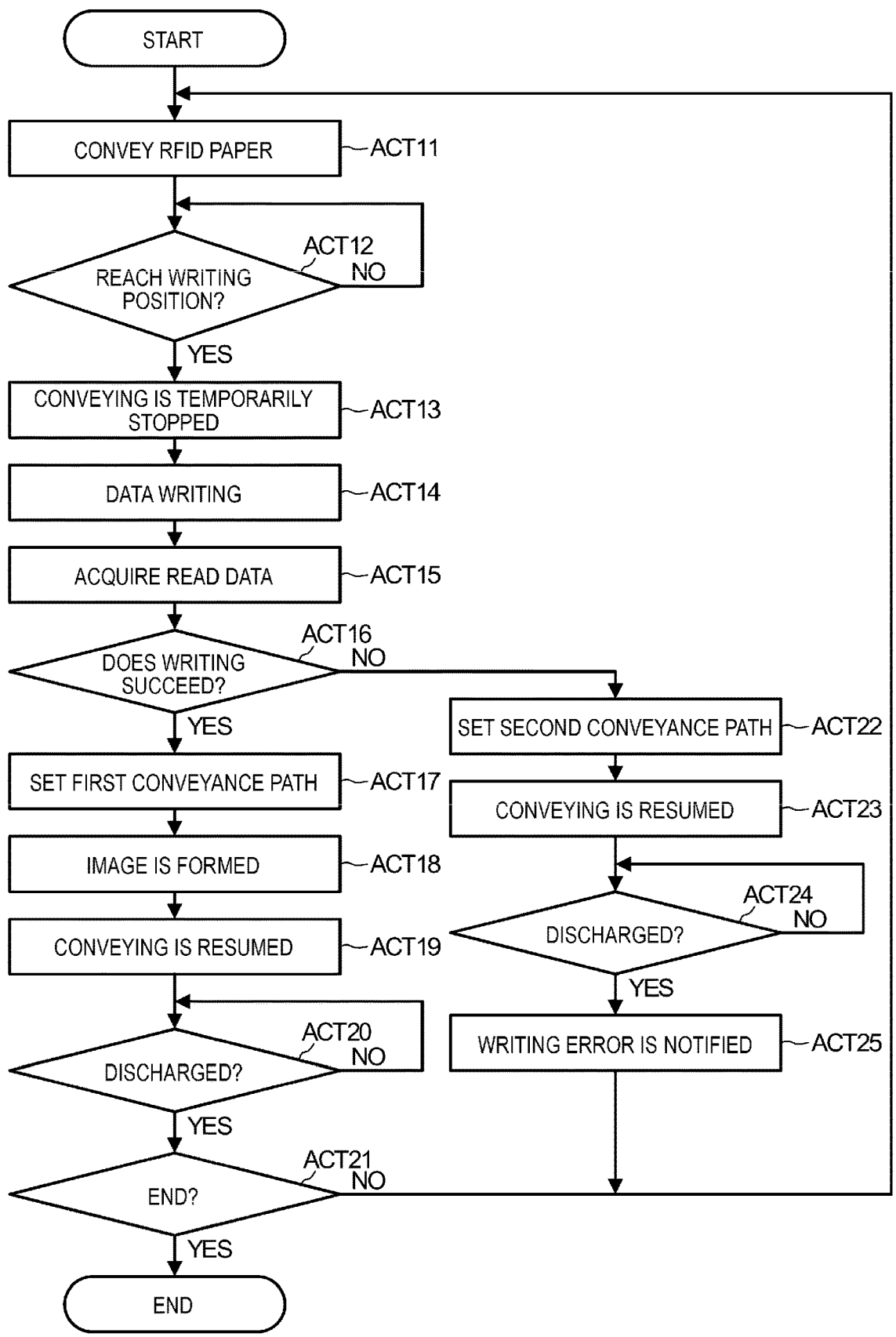
FIG. 5 is a flowchart illustrating an example of RFID processing by an image forming apparatus.

FIG. 5 is a flowchart illustrating the example of RFID processing related to the writing data to, and the printing on, the RFID paper $P_{rf}$ according to the first embodiment. The processor 61 performs this processing based on the program stored in the ROM 62, auxiliary storage device 64, or the like.

When the image forming apparatus 100 receives the image data to be printed on the RFID paper $P_{rf}$ and the data to be written to the RFID tag from a server device or a user terminal via the communication interface 69, the image forming apparatus 100 starts the process illustrated in FIG. 5. It is noted that the image data and data to be written can be stored in the RAM 63 or the auxiliary storage device 64.

In ACT11, the processor 61 operates as the RFID paper conveyance control unit 611 and controls the printer 2 via the printer interface 66 to convey the RFID paper $P_{rf}$. For example, in the example illustrated in FIG. 1, the processor 61 causes the pick-up roller 21A to pick up a piece of RFID paper $P_{rf}$ from the paper feed cassette 20A and convey the RFID paper $P_{rf}$ to the registration roller 23.

In ACT12, the processor 61 determines whether the RFID paper $P_{rf}$ reaches a writing position. The writing position corresponds to the position of the registration roller 23 in this first embodiment. Therefore, in this example, it is determined whether the RFID paper $P_{rf}$ reaches the registration roller 23. For example, the image forming apparatus 100 can have a detector, such as a mechanical switch or an optical sensor, for detecting when paper reaches or is at the registration roller 23. The processor 61 can acquire the output of such a detector via the printer interface 66 or the like. If the RFID paper $P_{rf}$ does not reach the writing position (NO in ACT12), the processor 61 repeats the processing operation in ACT12. In this manner, the processor 61 waits for the RFID paper $P_{rf}$ to reach the registration roller 23.

When the RFID paper $P_{rf}$ reaches the writing position (YES in ACT12), the processor 61 controls the conveying unit 22 via the printer interface 66 in ACT13 to temporarily stop the conveying of the RFID paper $P_{rf}$.

In ACT14, the processor 61 operates as the RFID writing control unit 612 and writes RFID data. Specifically, the processor 61 transmits the data to be written to the RFID tag of the RFID paper $P_{rf}$ as stored in the RAM 63 or the auxiliary storage device 64 to the RFID module 51 of the RFID reader/writer 5 via the RFID reader/writer interface 68. The RFID module 51 upon receiving this data executes writing to the RFID tag of the RFID paper $P_{rf}$ that is stopped at the writing position. Specifically, the RFID module 51 emits electromagnetic waves for writing data (write information) by using the antenna 52. By receiving this electromagnetic wave, the RFID tag of the RFID paper $P_{rf}$ writes data to the storage area.

In ACT15, the processor 61 operates as the writing success/failure determination unit 613 and acquires (as read data) the data that was written to the RFID tag of the RFID paper $P_{rf}$. Specifically, the processor 61 instructs the RFID reader/writer 5 to read data from the RFID tag via the RFID reader/writer interface 68. Upon receiving this instruction, the RFID module 51 emits electromagnetic waves from the antenna 52 for reading data written in the RFID tag. Upon receiving this electromagnetic wave, the RFID tag responds with the data recorded in the storage area of the RFID tag. The RFID module 51 outputs data (the read data) received from the RFID tag via the antenna 52. The processor 61 acquires the read data from the RFID module 51 via the RFID reader/writer interface 68.

In ACT16, the processor 61 determines whether the writing of data to the RFID tag of the RFID paper $P_{rf}$ has succeeded. Specifically, whether the writing succeeds or fails is determined by comparing the data as read (the read data) from the RFID reader/writer 5 via the RFID reader/writer interface 68 matches the data to be written that was stored in the RAM 63 or the auxiliary storage device 64. If the writing does not succeed, that is, the writing fails (NO in ACT16), the processor 61 shifts to the processing operation of ACT22

If the writing succeeds (YES in ACT16), the processor 61 operates as the RFID paper conveyance control unit 611 in ACT17 and sets the first conveyance path as the conveyance path for the successfully written RFID paper $P_{rf}$. Specifically, the processor 61 switches the flapper 22E in the conveying unit 22 to the lower stage paper discharge tray 29A via the printer interface 66.

In ACT18, the processor 61 operates as the RFID paper printing control unit 614 and forms (prints) the image. Specifically, the processor 61, via the printer interface 66, causes the image forming unit 24 to transfer (primarily transfer) the toner image generated according to the image data to the transfer belt 26.

In ACT19, the processor 61 resumes the conveying of the RFID paper $P_{rf}$, which was temporarily stopped at the position of the registration roller 23. Specifically, the processor 61 restarts driving of rollers of the conveying unit 22 via the printer interface 66. Accordingly, the temporarily stopped RFID paper $P_{rf}$ is conveyed to the transfer position at the timing appropriate for transferring the image from the transfer belt 26 to the RFID paper $P_{rf}$, and thus, the toner image transferred on the transfer belt 26 is secondarily transferred onto the RFID paper $P_{rf}$. In this manner, the image is printed on the RFID paper $P_{rf}$ after data was successfully written to the RFID tag.

In ACT20, the processor 61 determines whether the RFID paper $P_{rf}$ for which the RFID data was successfully and on which an image has been printed is conveyed through the first conveyance path and discharged to the lower stage paper discharge tray 29A. For example, the image forming apparatus 100 can include a detector such as a mechanical switch or an optical sensor for detecting that the paper is discharged. The processor 61 can acquire the output of such a detector/sensor via the printer interface 66. If the RFID paper $P_{rf}$ is not yet discharged to the lower stage paper discharge tray 29A (NO in ACT20), the processor 61 repeats the processing operation of this ACT20. In this manner, the processor 61 waits for the RFID paper $P_{rf}$ to be discharged to the lower stage paper discharge tray 29A.

Once the RFID paper $P_{rf}$ is discharged to the lower stage paper discharge tray 29A (YES in ACT20), the processor 61 determines in ACT21 whether the processing is to end. Specifically, the processor 61 can perform this termination determination by checking whether other data is to be written to the RFID paper $P_{rf}$ is stored in the RAM 63 or the auxiliary storage device 64. Alternatively, the processor 61 can check whether the writing of data to the paper has been completed. If the processing is not finished (NO in ACT21), the processor 61 returns to the processing operation of ACT11. Accordingly, the above-described processing operation can be repeated for the next RFID paper $P_{rf}$. In this manner, the RFID paper $P_{rf}$ on which the data is written to the RFID tag and the image is printed is placed on the lower stage paper discharge tray 29A.

If the process is complete in ACT21 (YES in ACT21), the processor 61 ends the processing illustrated in this flowchart.

If the writing fails in ACT16 (NO in ACT16), the processor 61 operates as the RFID paper conveyance control unit 611 in ACT22 and sets the second conveyance path as the conveyance path for the RFID paper $P_{rf}$ (an unsuccessfully written RFID paper $P_{rf}$). Specifically, the processor 61 switches the flapper 22E in the conveying unit 22 to the upper stage paper discharge tray 29B side via the printer interface 66.

In ACT23, the processor 61 resumes the conveying of the RFID paper $P_{rf}$ which was temporarily stopped at the position of the registration roller 23. Specifically, the processor 61 restarts driving of rollers of the conveying unit 22 of the printer 2 via the printer interface 66. Accordingly, the temporarily stopped RFID paper $P_{rf}$ is conveyed toward the upper stage paper discharge tray 29B. At this time, the processor 61 operates as the RFID paper printing control unit 614 and does not permit the image forming unit 24 to perform printing operations on the paper. Therefore, even when the RFID paper $P_{rf}$ passes through the secondary transfer position, no printing is performed on the RFID paper $P_{rf}$ and the RFID paper $P_{rf}$ remains blank (unprinted).

In ACT24, the processor 61 determines whether the blank RFID paper $P_{rf}$ is conveyed through the second conveyance path and discharged to the upper stage paper discharge tray 29B. If the blank RFID paper $P_{rf}$ is not yet discharged to the upper stage paper discharge tray 29B (NO in ACT24), the processor 61 repeats the processing operation of this ACT24. In this manner, the processor 61 waits for the blank RFID paper $P_{rf}$ to be discharged to the upper stage paper discharge tray 29B.

Once the blank RFID paper $P_{rf}$ is discharged to the upper stage paper discharge tray 29B (YES in ACT24), the processor 61 operates as the writing success/failure determination unit 613 in ACT25 and notifies of a writing error. Specifically, the processor 61 performs an error display on the display unit 4a of the operation panel 4 via the input/output interface 67. The error display notification may indicate a blank RFID paper $P_{rf}$ has been discharged to the upper stage discharge tray 29B or the like. When the image forming apparatus 100 includes a speaker as an output device, an error sound may be output together with this error display. Furthermore, or alternatively, the processor 61 can transmit an error notification via the communication interface 69 to a server device or user terminal which was a transmission source of the data to be written.

After that, the processor 61 returns to the processing operation of ACT11. Accordingly, since the above-described processing can be repeated for the next RFID paper $P_{rf}$, the writing of data that was not successfully written can be attempted on the next RFID paper $P_{rf}$. In this manner, the blank RFID paper $P_{rf}$ on which the RFID data could not be written is placed on the upper stage paper discharge tray 29B, and a retry process of writing the RFID data to another RFID paper $P_{rf}$ can be executed.

As described above, the image forming apparatus 100 according to the first embodiment includes a conveying unit 22 that conveys the RFID paper $P_{rf}$ from the paper feed cassette (for example, the paper feed cassette 20A) or the manual feed tray 20D. The RFID paper $P_{rf}$ has a RFID tag and may be of any physical size. A transfer unit 27 transfers the toner image from the transfer belt 26 to the RFID paper $P_{rf}$ conveyed by the conveying unit. A RFID reader/writer 5 communicates with the RFID tag embedded in the RFID paper $P_{rf}$ to write data to the RFID tag and also read data written in the RFID tag. The RFID paper $P_{rf}$ is stopped at a position between the paper feed cassette (or the manual feed tray 20D) and the transfer unit 27 when the RFID tag is written or read. A processor 61 of the control unit 6 that controls the conveying unit 22, image forming unit 24, transfer belt 26, and transfer unit 27, and the RFID reader/writer 5. In this manner, a paper feed cassette (for example, the paper feed cassette 20A) and a manual feed tray 20D are paper placing units, the image forming unit 24, the transfer belt 26, and the transfer unit 27 are printing units, and the RFID reader/writer 5 is a reader/writer unit. According to an image forming apparatus 100 according to the first embodiment, the processor 61 determines whether the writing data to the RFID tag has succeeded based on the data read by the RFID reader/writer 5. When it is determined that the writing data has succeeded, the processor 61 controls the printing unit so as to perform printing on the RFID paper $P_{rf}$. If the processor 61 determines that writing of data fails, the processor 61 controls the printing unit so as not to print on the RFID paper $P_{rf}$ and controls the conveying unit 22 and the RFID reader/writer 5 to convey another (different) RFID paper $P_{rf}$ from the paper placing unit and executes a retry process for permitting the previously failed tag data to be written to the RFID tag in another (next) RFID paper $P_{rf}$ to be fed.

There are cases where the RFID tag may have been damaged by impact or the like and become unusable, or the tag damage may occur in the printing on the RFID paper $P_{rf}$ rather than the writing of data to RFID tag. Therefore, in an image forming apparatus 100 continuously prints on a roll of paper before individual sheets are cut from the roll or the like, when the writing error occurs before printing, the RFID paper $P_{rf}$ (cut sheet) can be discharged as a blank sheet without being printed. In this manner, by not performing printing, that is, by not performing unnecessary printing, the toner can be saved.

Furthermore, by not performing printing on a RFID paper $P_{rf}$ for which the RFID tag writing failed, the next printed RFID paper $P_{rf}$ (the replacement sheet) for which RFID tag data was correctly written can be easily distinguished from the blank (unwritten RFID paper $P_{rf}$). The user of the image forming apparatus 100 can recognize whether there is the RFID tag writing error by checking whether the paper is blank, and since the paper is blank, any RFID paper $P_{rf}$ for which a RFID tag writing error occurs can be reused as regular paper (a sheet without the RFID). In this manner, an image forming apparatus that notifies the user of a failed RFID paper $P_{rf}$ allows the failed RFID paper $P_{rf}$ to be reused.

It is noted that there are various factors that cause the tag writing errors, and there may be cases where the RFID tag in the RFID paper $P_{rf}$ does not itself fail. For example, there may be an error caused by external radio waves (temporary interference), a failure or glitch of the RFID reader/writer 5 on the image forming apparatus 100 side, or the incorrect use/loading of regular paper (paper without the RFID tag). In such cases, the RFID paper $P_{rf}$ will still be blank after a failed tag writing attempt. Therefore, the RFID paper $P_{rf}$ discharged as blank paper may be reused not only as regular paper (paper without RFID) but as RFID paper $P_{rf}$ again. When the RFID tag of the RFID paper $P_{rf}$ is out of order, the paper is simply discharged as the blank paper again.

Furthermore, when the tag writing error occurs, since the processor 61 retries writing the data and printing the image for which the writing data fails on another RFID paper $P_{rf}$, the data requested to be written and printed and the RFID paper $P_{rf}$ with the image recorded thereon can still be reliably obtained.

It is noted that the image forming apparatus 100 according to the first embodiment is provided with the lower stage paper discharge tray 29A and the upper stage paper discharge tray 29B, and the conveying unit 22 is provided with the flapper 22E for switching the discharge destination of the RFID paper $P_{rf}$ between t lower stage paper discharge tray 29A and the upper stage paper discharge tray 29B. In this manner, the lower stage paper discharge tray 29A is a first paper discharge unit. The upper stage paper discharge tray 29B is a second paper discharge unit, and the flapper 22E is a switching unit. The processor 61 of the control unit 6 controls the flapper 22E so that the RFID paper $P_{rf}$ on which an image has been printed is discharged to the lower stage paper discharge tray 29A and the RFID paper $P_{rf}$ on which the image has not been printed is discharged to the upper stage paper discharge tray 29B.

In this manner, a user can distinguish between the RFID paper $P_{rf}$ with a tag writing error and the RFID paper $P_{rf}$ on which the tag writing was normally performed by the paper discharge tray branching.

The image forming apparatus 100 according to the first embodiment is further provided with a display unit 4a (of the operation panel 4) and/or a communication interface 69 that also notifies the user when writing data to a RFID tag fails and failed RFID paper $P_{rf}$ is discharged to the upper stage paper discharge tray 29B. In this manner, the display unit 4a or the communication interface 69 is a notification unit.

The image forming apparatus 100 according to the first embodiment includes the registration roller 23 that is disposed in front of the transfer unit 27 of the printing unit and temporarily stops the RFID paper $P_{rf}$ conveyed from the paper placing unit, and the RFID reader/writer 5 is placed at a position near where the RFID paper $P_{rf}$ is temporarily stopped by the registration roller 23 for communicating with the RFID tag in the temporarily stopped RFID paper $P_{rf}$. Then, the processor 61 of the control unit 6 controls the RFID reader/writer 5 so as to perform the writing data to the RFID tag and the reading data from the RFID tag when the RFID paper $P_{rf}$ is temporarily stopped by the registration roller 23.

In this manner, since writing and reading of data to and from the RFID tag by the RFID reader/writer 5 can be performed with the RFID paper $P_{rf}$ being stopped, reliable writing data and reading can be realized.

Further, in the image forming apparatus 100 according to the first embodiment, the processor 61 of the control unit 6 controls the conveying unit 22 so that the conveying of the RFID paper $P_{rf}$ is resumed after waiting for the determination of the success or failure of the writing of data to the RFID tag.

In this manner, the RFID paper $P_{rf}$ is kept at the position of the registration roller 23 until the determination of the success or failure of writing data to the RFID tag is ascertained, so that there is no concern that an image will be printed on RFID paper $P_{rf}$ for which writing tag data is not successfully completed.

Second Embodiment

In the first embodiment, the processing operation for the next RFID paper Prf is started after the prior RFID paper Prf is discharged. This second embodiment is an example in which this waiting is omitted.

The image forming apparatus 100 according to the second embodiment is generally the same as that of the first embodiment, and overlapping description will be omitted.

Figure 6:
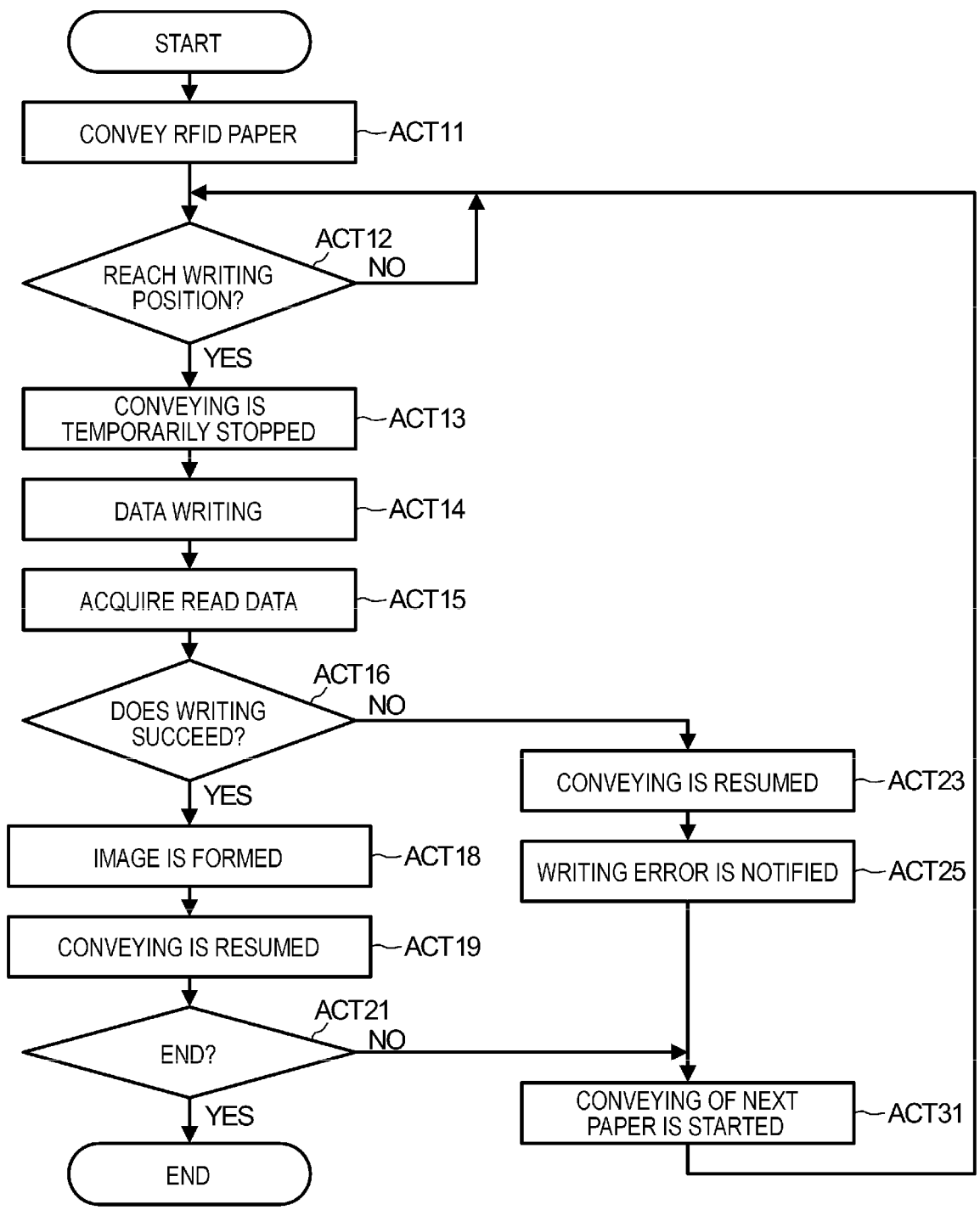
FIG. 6 is a flowchart illustrating an example of RFID writing by an image forming apparatus according to a second embodiment.
Figure 7:
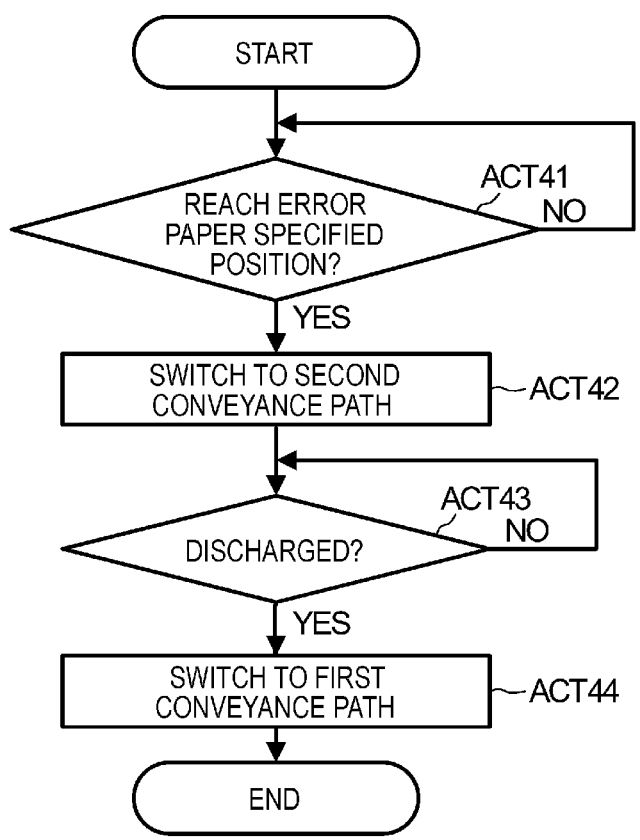
FIG. 7 is a flowchart illustrating an example of conveyance control processing in RFID processing of an image forming apparatus.

FIG. 6 is a flowchart illustrating an example of RFID writing by the image forming apparatus 100 according to the second embodiment, and FIG. 7 is a flowchart illustrating an example of conveyance control processing in the RFID processing. The processor 61 can execute these two processes simultaneously in the second embodiment.

In the RFID writing processing operation illustrated in FIG. 6, processing in ACT11 to ACT16 is the same as in the first embodiment.

When the writing is determined in ACT16 (YES in ACT16) to have succeeded, the processor 61 operates in ACT18 as the RFID paper printing control unit 614 to form an image. In ACT19, the processor 61 resumes the conveying of the RFID paper $P_{rf}$ which was temporarily stopped at the registration roller 23 (tag writing position). Accordingly, the image is printed on the RFID paper $P_{rf}$ after data is written to the RFID tag.

In ACT21, the processor 61 determines whether to end the present processing.

If not (NO in ACT 21), the processor 61 operates as the RFID paper conveyance control unit 611 in ACT 31 and controls the printer 2 via the printer interface 66 to start the conveying of the next RFID paper $P_{rf}$. For example, in the example illustrated in FIG. 1, the processor 61 causes the pick-up roller 21A to pick up the next piece of paper of the RFID paper $P_{rf}$ from the paper feed cassette 20A and convey the just fed RFID paper $P_{rf}$ to the registration roller 23. After that, the processor 61 returns to the processing operation of ACT12. Accordingly, at the same time as a printing on an RFID paper $P_{rf}$ for which an RFID tag has been successfully written with data and the conveying of this printed sheet to the lower stage paper discharge tray 29A, initial processing operations for the next RFID paper $P_{rf}$ to be printed can be performed.

Based on a determination that the writing fails in ACT16 (NO in ACT16), the processor 61 operates as the RFID paper conveyance control unit 611 in ACT23, and the conveying of the RFID paper $P_{rf}$ which was stopped at the registration roller 23 is resumed.

In ACT25, the processor 61 operates as the writing success/failure determination unit 613 and notifies a writing error (tag writing failure). After that, the processor 61 proceeds to the processing operation of ACT31.

The processor 61 starts the conveyance control process illustrated in FIG. 7 in response to an error notification. First, in ACT41, the processor 61 operates as the RFID paper conveyance control unit 611 and determines whether a sheet with a tag writing error (a writing error paper) reaches a specified position. The specified position can be, for example, a position in front of the flapper 22E or the position of the fixer 28. Determination of whether the specified position has been reached can be performed by using a detector such as a mechanical switch or an optical sensor, or measuring the elapsed time from when the conveying was resumed in ACT23 by using the RTC 70 and calculating the position of the blank RFID paper $P_{rf}$ based on the elapsed time and the known conveyance speed. If the blank RFID paper $P_{rf}$ (the writing error paper) has not reached the specified position (NO in ACT 41), the processor 61 repeats the processing operation of ACT 41. In this manner, the processor 61 waits for the blank RFID paper $P_{rf}$ to reach the specified position.

When the blank RFID paper $P_{rf}$ reaches the specified position (YES in ACT41), the processor 61 sets the second conveyance path as the conveyance path for the RFID paper $P_{rf}$ in ACT42. Specifically, the processor 61 switches the flapper 22E in the conveying unit 22 to the upper stage paper discharge tray 29B via the printer interface 66.

In ACT43, the processor 61 determines whether the blank RFID paper $P_{rf}$ has been conveyed through the second conveyance path and discharged to the upper stage paper discharge tray 29B. If the blank RFID paper $P_{rf}$ is not yet discharged to the upper stage paper discharge tray 29B (NO in ACT43), the processor 61 repeats the processing operation of this ACT43. In this manner, the processor 61 waits for the blank RFID paper $P_{rf}$ to be discharged to the upper stage paper discharge tray 29B.

Once the blank RFID paper $P_{rf}$ is discharged to the upper stage paper discharge tray 29B (YES in ACT43), the processor 61 sets the first conveyance path as the conveyance path for the next RFID paper $P_{rf}$ in ACT44. Specifically, the processor 61 switches the flapper 22E in the conveying unit 22 of the printer 2 to the lower stage paper discharge tray 29A via the printer interface 66.

In this manner, the blank RFID paper $P_{rf}$ for which writing of data to the RFID tag failed is conveyed to the upper stage paper discharge tray 29B and, at the same time, the processing operation for the next RFID paper $P_{rf}$ can be started.

As described above, according to the image forming apparatus 100 according to the second embodiment, since the processing operation for the next RFID paper $P_{rf}$ is started without waiting for the RFID paper $P_{rf}$ to be discharged, continuous writing data and printing can be performed at higher speed.

Although the first and second embodiments have been described above, the various embodiments are not limited thereto.

For example, the RFID paper $P_{rf}$ on which tag writing has been successfully performed and on which image printing has been performed is discharged to the lower stage paper discharge tray 29A and the blank RFID paper $P_{rf}$ on which tag writing failed is discharged to the upper stage paper discharge tray 29B, but the reverse arrangement may be adopted. In some examples, when the user designates the discharge destination for the RFID paper $P_{rf}$, the second paper discharge unit can be set to be any un-designated paper discharge tray by default or by user choice. When there are three or more paper discharge trays, any paper discharge tray can be used as the second paper discharge unit.

Furthermore, in an embodiment, the conveying of the RFID paper $P_{rf}$ stopped by the registration roller 23 is resumed after waiting for a determination of the success or failure of writing data to the RFID tag is complete, but when the RFID reader/writer 5 is out of order, the success/failure determination cannot be performed, so that the RFID paper $P_{rf}$ will remain stopped. Therefore, when the RFID paper $P_{rf}$ remains stopped at the registration roller 23 for more than a certain period of time, the user may be notified of a failure of the RFID reader/writer 5.

In the RFID processing illustrated in FIG. 5, the processing operation writing data in ACT14 and the processing operation acquiring read data in ACT15 may be performed simultaneously with the processing operations in ACT12 and ACT13. In this case, the processing operation of ACT12 is a processing operation that does not determine when the writing position is reached but may be a determination of when a writing completion waiting position has been reached. The writing completion waiting position may be the position of the registration roller 23. In this manner, the conveying of the RFID paper $P_{rf}$ and the writing data to the RFID tag may be performed simultaneously. Furthermore, the processing operation setting the first conveyance path in ACT17 may be performed after the processing operation for forming the image in ACT18 or the processing operation restarting the conveying of the RFID paper $P_{rf}$ in ACT19. In this manner, some processing operations may be performed simultaneously, the order of some processing operations may be changed, and the processing contents of some processing operations may be modified.

In an embodiment, a multifunction peripheral (MFP) is used as the example of an image forming apparatus 100, but a printer having no scanner may be adopted instead.

In an embodiment, a program is stored in advance in the ROM 62 or the auxiliary storage device 64 of the control unit 6 of the image forming apparatus 100. In other examples, programs may be transferred separately in a writable storage device and later installed in the image forming apparatus 100 by a system administrator or the like. Programs and the like can be transferred in a removable computer-readable storage medium or by via a network. The computer-readable storage medium may be of any format, such as a CD-ROM or a memory card, that can store a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a paper storage unit;
a printing unit configured to print images on a sheet of paper from the paper storage unit;
a conveying unit configured to convey sheets one by one along a path from the paper storage unit to the printing unit;
a tag reader/writer unit configured to communicate with a wireless tag on a sheet being conveyed by the conveying unit when the sheet is at a communication position on the path before the printing unit; and
a control unit configured to:
determine whether a writing of first data to a wireless tag on a first sheet has succeeded by controlling the tag reader/writer to read data from the wireless tag on the first sheet,
control the printing unit to print an image on the first sheet when it is determined the writing of the first data to the wireless tag on the first sheet succeeded, control the printing unit not to print any image on the first sheet when it is determined the writing of the first data to the wireless tag on the first sheet failed, and after it is determined the writing of the first data to the wireless tag on the first sheet failed, execute a retry process by controlling the conveying unit to convey a second sheet from paper storage unit to the communication position on the path and the tag reader/writer to write the first data to a wireless tag on the second sheet.

2. The image forming apparatus according to claim 1, further comprising:
a first discharge location for sheets; and
a second discharge location for sheets, wherein
the conveying unit includes a path switching unit after the printing unit for switching a discharge destination of sheets between the first and second discharge locations, and
the control unit is configured to control the path switching unit so sheets on which an image has been printed by the printing unit are discharged to the first discharge location and sheets on which an image has not been printed by the printing unit are discharged the second discharge location.

3. The image forming apparatus according to claim 2, further comprising:
a notification unit configured to indicate to a user that a sheet for which the writing of data to the wireless tag has failed has been discharged to the second discharge location.

4. The image forming apparatus according to claim 3, wherein the notification unit comprises a display screen.

5. The image forming apparatus according to claim 2, wherein
the first discharge location is a first paper tray, and
the second discharge location is a second paper tray.

6. The image forming apparatus according to claim 1, further comprising:
a registration roller on the path before the printing unit, wherein,
the communication position is at the registration roller.

7. The image forming apparatus according to claim 6, wherein the control unit is configured to control the tag reader/writer unit so as to perform the writing of data to wireless tags on sheets that are temporarily stopped at the registration roller.

8. The image forming apparatus according to claim 1, wherein the wireless tag is an RFID tag.

9. A multifunction peripheral device, comprising:
a paper storage unit;
a printing unit configured to print images on a sheet of paper from the paper storage unit;
a tag reader/writer unit configured to communicate with a wireless tag on a sheet at a communication position on a conveyance path before the printing unit;
a first discharge location for sheets;
a second discharge location for sheets;
a conveying unit configured to convey sheets one by one from the paper storage unit to the printing unit and then to the first or second discharge location; and
a control unit configured to:
control the tag reader/writer unit attempt a writing of first data to a wireless tag on a first sheet from the paper storage unit at the communication position,
determine whether the writing of first data to a wireless tag on the first sheet has succeeded by controlling the tag reader/writer to read data from the wireless tag on the first sheet, control the printing unit to print an image on the first sheet when it is determined the writing of the first data to the wireless tag on the first sheet succeeded and the conveying unit to convey the first sheet to the first discharge location, and control the printing unit not to print any image on the first sheet when it is determined the writing of the first data to the wireless tag on the first sheet failed and the conveying unit to convey the first sheet to second discharge location.

10. The multifunction peripheral device according to claim 9, wherein the control unit is further configured to:
execute a retry process after it is determined the writing of the first data to the wireless tag on the first sheet failed by controlling the conveying unit to convey a second sheet from paper storage unit to the communication position on the path and the tag reader/writer to write the first data to a wireless tag on the second sheet.

11. The multifunction peripheral device according to claim 9, wherein the conveying unit includes a path switching unit after the printing unit for switching a discharge destination of sheets between the first and second discharge locations.

12. The multifunction peripheral device according to claim 9, further comprising:
a notification unit configured to indicate to a user that a sheet for which the writing of data to the wireless tag has failed has been discharged to the second discharge location.

13. The multifunction peripheral device according to claim 12, wherein the notification unit comprises a display screen.

14. The multifunction peripheral device according to claim 9, wherein
the first discharge location is a first paper tray, and
the second discharge location is a second paper tray above the first discharge location.

15. The multifunction peripheral device according to claim 9, further comprising:
a registration roller on the path before the printing unit, wherein,
the communication position is at the registration roller.

16. The multifunction peripheral device according to claim 9, wherein the wireless tag is an RFID tag.

17. The multifunction peripheral device according to claim 9, wherein the control unit is further configured to:
after it is determined the writing of the first data to the wireless tag on the first sheet succeeded, control the tag reader/writer unit attempt a writing of second data to a wireless tag on a second sheet from the paper storage unit at the communication position.

18. An image forming apparatus, comprising:
a paper storage unit;
a printing unit configured to print images on a sheet of paper from the paper storage unit;
a conveying unit configured to convey sheets one by one along a path from the paper storage unit to the printing unit;
a tag reader/writer unit configured to communicate with a wireless tag on a sheet being conveyed by the conveying unit when the sheet is at a communication position on the path before the printing unit; and
a control unit configured to:
attempt a writing of first data to a wireless tag on a first sheet at the communication position, determine whether the writing of first data to the wireless tag on the first sheet has succeeded by controlling the tag reader/writer to read data from the wireless tag on the first sheet, control the printing unit to print an image on the first sheet when it is determined the writing of the first data to the wireless tag on the first sheet succeeded, control the printing unit not to print any image on the first sheet when it is determined the writing of the first data to the wireless tag on the first sheet failed, and after it is determined the writing of the first data to the wireless tag on the first sheet failed, execute a retry process by controlling the conveying unit to convey a second sheet from paper storage unit to the communication position on the path and the tag reader/writer to write the first data to a wireless tag on the second sheet.

19. The image forming apparatus according to claim 18, further comprising:
a first discharge location for sheets; and
a second discharge location for sheets, wherein
the conveying unit includes a path switching unit after the printing unit for switching a discharge destination of sheets between the first and second discharge locations, and
the control unit is configured to control the path switching unit so sheets on which an image has been printed by the printing unit are discharged to the first discharge location and sheets on which an image has not been printed by the printing unit are discharged the second discharge location.

20. The image forming apparatus according to claim 19, further comprising:
a notification unit configured to indicate to a user that a sheet for which the writing of data to the wireless tag has failed has been discharged to the second discharge location.

* * * * *